(No Model.)

H. DECK.
LAWN MOWER.

No. 519,080. Patented May 1, 1894.

Witnesses:
Jesse B. Heller.
O.M. Dittrich.

Inventor.
Henry Deck,
By
Attorney.

UNITED STATES PATENT OFFICE.

HENRY DECK, OF PHILADELPHIA, PENNSYLVANIA, ASSIGNOR TO JOHN BRAUN, WILLIAM P. M. BRAUN, AND JOHN F. BRAUN, OF SAME PLACE.

LAWN-MOWER.

SPECIFICATION forming part of Letters Patent No. 519,080, dated May 1, 1894.

Application filed July 28, 1893. Serial No. 481,685. (No model.)

*To all whom it may concern:*

Be it known that I, HENRY DECK, of the city and county of Philadelphia and State of Pennsylvania, have invented an Improvement in Lawn-Mowers, of which the following is a specification.

My invention relates to lawn mowers, and consists of certain improvements which are fully set forth in the following specification and are shown in the accompanying drawings.

More particularly my improvements relate to the stationary or ledger knife of the lawn mower and have for their object the adjustment of that knife so as to bear evenly upon the blades of the rotary cutter.

Experience has demonstrated that the wear, due to frictional contact between the cutting edges of the stationary knife and the rotary cutter blades, is greater at the center of the stationary knife than at the edges; and consequently after a lawn mower has been subjected to considerable use the blades do not cut evenly. This cannot be overcome by any adjustment of the stationary knife as an entirety, since such adjustment, moving all parts evenly will bring the less worn end portions of the stationary cutter nearer the rotary cutters than the more worn central portion, and as a result the blades of the rotary cutter will bind at the edges of the stationary knife.

It is the object of my invention to overcome this defect by providing the stationary knife with such means of adjustment that the central, or more worn portion, of its cutting edge shall be moved upward more than the ends, or less worn portions. To accomplish this object I provide the stationary knife, or bar which carries it, with adjusting devices which act upon its ends and spring or bend the knife, so that its central portion is thrown upward into proper position to present an even cutting edge with the outer portions.

I shall now refer to the accompanying drawings for the purpose of more clearly describing my invention.

Figure 1:
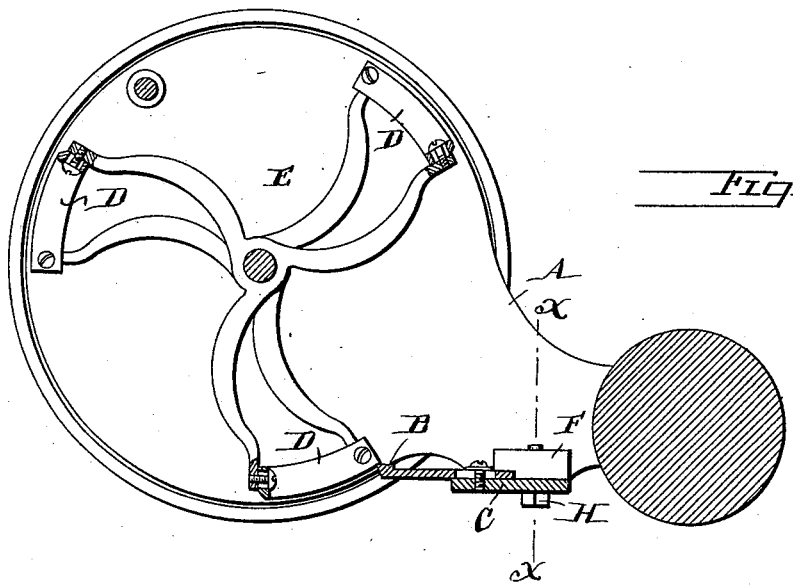
Figure 2:
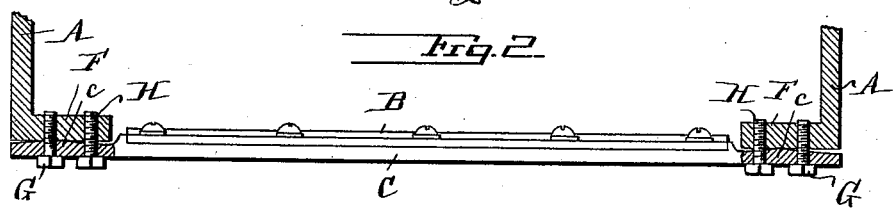
Figure 3:
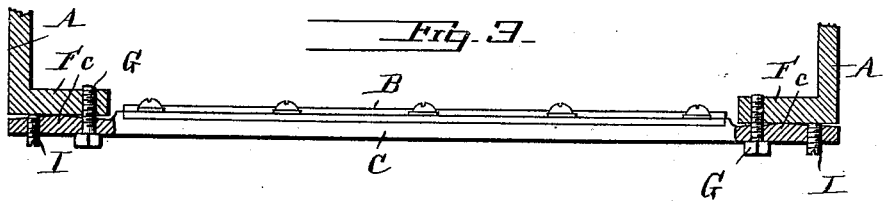
Figure 4:
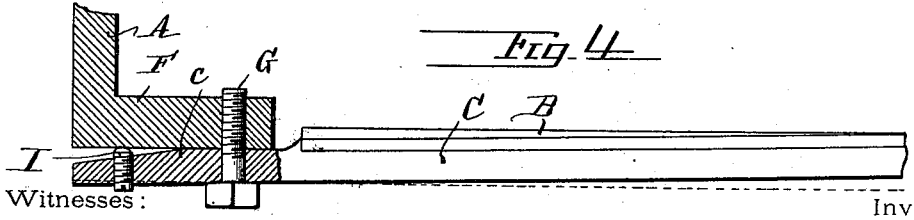

Figure 1 is a vertical sectional view through the cutting devices of a lawn mower, showing only so much of the machine as is necessary to a clear explanation of my invention. Fig. 2 is a vertical sectional view of the stationary blade and its bar and portions of the side frames. Fig. 3 is a similar view illustrating a slight modification. Fig. 4 is an enlarged view of part of Fig. 3 illustrating the adjustment of the stationary cutter.

A are the side frames to which the stationary cutter and its bar are secured.

B is the stationary knife or ledger blade.

C is the ledger blade bar.

D are the blades of the rotary cutter E.

The knife or ledger blade B and the bar C may be made in one piece or the blade B may be separate and secured to the bar C. The latter is the usual construction employed. The bar C is fastened at its ends to the flanges F of the side frames by bolts or screws G in the usual manner. At the ends of the bar C (or blade B) adjacent to the bolts or screws H, I arrange the adjusting devices. These are preferably adjusting screws between the frame A and the ends of the bar C, so arranged that by the adjustment of the ends of the bar C the bar as an entirety will be sprung or bent, so as to throw the central portion of the knife or blade B upward.

In Fig. 2 I have shown headed screws H located on the inner side of the fastening screws G and passing through the bar C into the flanges F. The ends of the bar C may be formed with bearing ribs or points c which rest in contact with the flanges F and thus permit the movement of the ends of the bar under the action of the screws H. By tightening up the screws H so as to draw in the ends of the bar C within the points c the bar is caused to bend slightly so that its middle portion is thrown upward.

In the construction shown in Fig. 3 the ends of the bar C beyond the screws G are provided with adjusting screws I which bear against the frames A, so that by adjusting these screws to throw the extreme ends downward the bar and its cutter are bent and the central portion is thrown upward. Instead of the adjusting screws H and I other suitable adjusting devices may be employed arranged to act upon the ends of the blade or bar so as to bend it and thus bring it into proper adjustment. By reversing the operation the bar may be sprung downward at its center when desired.

What I claim as new, and desire to secure by Letters Patent, is—

1. In a lawn mower the combination with the side frames, of the stationary knife and its bar fastened to the side frames, and means independent of the fastening to adjust the ends of the bar so as to bend the bar and knife.

2. In a lawn mower, the combination with the side frames, of the stationary cutter and its bar fastened at its ends to the side frames, and bearing against said side frames at points adjacent to its ends, said bearing points consisting of projections on one of the parts resting against the face of the other, and adjusting screws between the ends of the cutter or bar and the side frames adjacent to the bearing points adapted to act upon the ends of the bar and bend the bar and force the central portion of the cutter upward so as to take up wear at said central portion.

3. In a lawn mower, the combination with the side frames, of the stationary knife and its bar carried by the side frames and adjusting devices between the bar and side frames to bend the bar and throw the central portion of the stationary knife upward.

4. In a lawn mower, the combination with the side frames, of the stationary cutter and its bar fastened at its ends to the side frames, and bearing against said side frames at points adjacent to its ends, said bearing points consisting of projections on one of the parts resting against the face of the other, and adjusting screws between the ends of the cutter or bar and the side frames adjacent to the bearing points, carried by one of the parts and bearing against the other, adapted to act upon the ends of the bar and bend the bar and force the central portion of the cutter upward so as to take up wear at said central portion.

In testimony of which invention I have hereunto set my hand.

HENRY DECK.

Witnesses:
ERNEST HOWARD HUNTER,
H. L. MOTHERWELL.